United States Patent
Song

(10) Patent No.: US 12,431,109 B2
(45) Date of Patent: Sep. 30, 2025

(54) DISPLAY DEVICE AND CONTROL METHOD FOR OUTPUTTING IMAGE SIGNAL INCLUDING INTERPOLATION FRAME

(71) Applicant: SAMSUNG ELECTRONICS CO., LTD., Suwon-si (KR)

(72) Inventor: Wonseok Song, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 18/428,867

(22) Filed: Jan. 31, 2024

(65) Prior Publication Data

US 2024/0169956 A1   May 23, 2024

Related U.S. Application Data

(63) Continuation of application No. PCT/KR2022/013114, filed on Sep. 1, 2022.

(30) Foreign Application Priority Data

Oct. 19, 2021   (KR) .................. 10-2021-0138973

(51) Int. Cl.
G09G 3/20   (2006.01)
G09G 5/28   (2006.01)

(52) U.S. Cl.
CPC ........... *G09G 5/28* (2013.01); *G09G 2310/08* (2013.01); *G09G 2320/0261* (2013.01);
(Continued)

(58) Field of Classification Search
CPC .................. G09G 2320/106; G09G 2340/02
See application file for complete search history.

(56) References Cited

U.S. PATENT DOCUMENTS

2007/0076796 A1   4/2007   Shi et al.
2007/0242080 A1*  10/2007  Hamada ............... H04N 19/44
                                                  375/E7.254

(Continued)

FOREIGN PATENT DOCUMENTS

JP   2008-160793 A   7/2008
JP   2012-9997 A     1/2012
(Continued)

OTHER PUBLICATIONS

International Search Report and Written Opinion (PCT/ISA/210 and PCT/ISA/237) dated Dec. 5, 2022, issued by International Searching Authority for International Application No. PCT/KR2022/013114.

*Primary Examiner* — Roy P Rabindranath

(74) *Attorney, Agent, or Firm* — Sughrue Mion, PLLC

(57) ABSTRACT

A display device includes: an image input unit configured to receive an image signal; a frame skip detector configured to detect a frame skip in the image signal; a frame skip compensation adjuster configured to determine information indicating whether to perform frame interpolation, interpolation input frame information, and an interpolation time, based on the frame skip detected by the frame skip detector; a frame interpolator configured to generate an interpolation frame, based on the information indicating whether to perform frame interpolation, the interpolation input frame information, and the interpolation time; and an image output unit configured to output an image signal including the interpolation frame corresponding to the interpolation time.

15 Claims, 9 Drawing Sheets

(52) U.S. Cl.
CPC ... *G09G 2320/106* (2013.01); *G09G 2340/02* (2013.01); *G09G 2360/12* (2013.01); *G09G 2360/18* (2013.01); *G09G 2370/22* (2013.01)

(56) References Cited

U.S. PATENT DOCUMENTS

| | | | |
|---|---|---|---|
| 2008/0025390 A1 | | 1/2008 | Shi et al. |
| 2022/0246073 A1* | | 8/2022 | Um .................. H04N 19/132 |

FOREIGN PATENT DOCUMENTS

| | | | |
|---|---|---|---|
| JP | 2012-169727 A | | 9/2012 |
| JP | 2013-38688 A | | 2/2013 |
| JP | 2020-47995 A | | 3/2020 |
| JP | 2020047995 | * | 3/2020 |
| KR | 10-2007-0109335 A | | 11/2007 |
| KR | 10-2008-0056248 A | | 6/2008 |
| KR | 10-2009-0042803 A | | 4/2009 |
| KR | 10-1032587 B1 | | 5/2011 |
| KR | 10-1542253 B1 | | 8/2015 |
| KR | 10-2017-0098139 A | | 8/2017 |
| KR | 10-2019-0056741 A | | 5/2019 |

* cited by examiner

DISPLAY DEVICE AND CONTROL METHOD FOR OUTPUTTING IMAGE SIGNAL INCLUDING INTERPOLATION FRAME

CROSS-REFERENCE TO RELATED APPLICATIONS

This application is a by-pass continuation application of International Application No. PCT/KR2022/013114, filed on Sep. 1, 2022, which is based on and claims priority to Korean Patent Application No. 10-2021-0138973, filed on Oct. 19, 2021, in the Korean Intellectual Property Office, the disclosures of which are incorporated by reference herein their entireties.

BACKGROUND

1. Field

The disclosure relates to a display device configured to detect a frame skip in an input image (an input video), interpolate a frame, and remove motion judder by a frame skip, and a method for controlling the display device.

2. Description of the Related Art

Frame skip means the absence of information about a specific frame in an image (video). The frame skip may occur as the image generation device fails to generate a frame at a specific time in the process of generating an image or due to disappearance of information about a specific frame caused by an unstable transmission environment during an image transmission. When a frame skip occurs, the image generation device or image playback device (or display device) repeatedly outputs the previous frame, so that a still image may be output during the period when the frame skip occurs. When a frame skip occurs in the original image section with a movement, a still section occurs during the movement, so that the user experiences a motion judder which is a break in the movement.

SUMMARY

Upon detecting a frame skip in an input image (an input video), a display device may output a smooth image free from motion judder by removing the frame with the skip and interpolating it with an appropriate image with a movement.

Provided are a display device configured to detect a frame skip in an input image (an input video), interpolate a frame, and remove motion judder by a frame skip, and a method for controlling the display device.

According to an aspect of the disclosure, a display device includes: an image input unit configured to receive an image signal; a frame skip detector configured to detect a frame skip in the image signal; a frame skip compensation adjuster configured to determine information indicating whether to perform frame interpolation, interpolation input frame information, and an interpolation time, based on the frame skip detected by the frame skip detector; a frame interpolator configured to generate an interpolation frame, based on the information indicating whether to perform frame interpolation, the interpolation input frame information, and the interpolation time; and an image output unit configured to output an image signal including the interpolation frame corresponding to the interpolation time.

According to an aspect of the disclosure, a method for controlling a display device, includes: receiving an image signal; detecting a frame skip in the image signal; determining information indicating whether to perform frame interpolation, interpolation input frame information, and an interpolation time, based on the detected frame skip; generating an interpolation frame, based on the information indicating whether to perform frame interpolation, the interpolation input frame information, and the interpolation time; and outputting an image signal including the interpolation frame corresponding to the interpolation time.

Embodiments of the disclosure are not limited to the foregoing, and other unmentioned effects would be apparent to one of ordinary skill in the art from the following description. In other words, unintended effects in practicing embodiments of the disclosure may also be derived by one of ordinary skill in the art from the embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
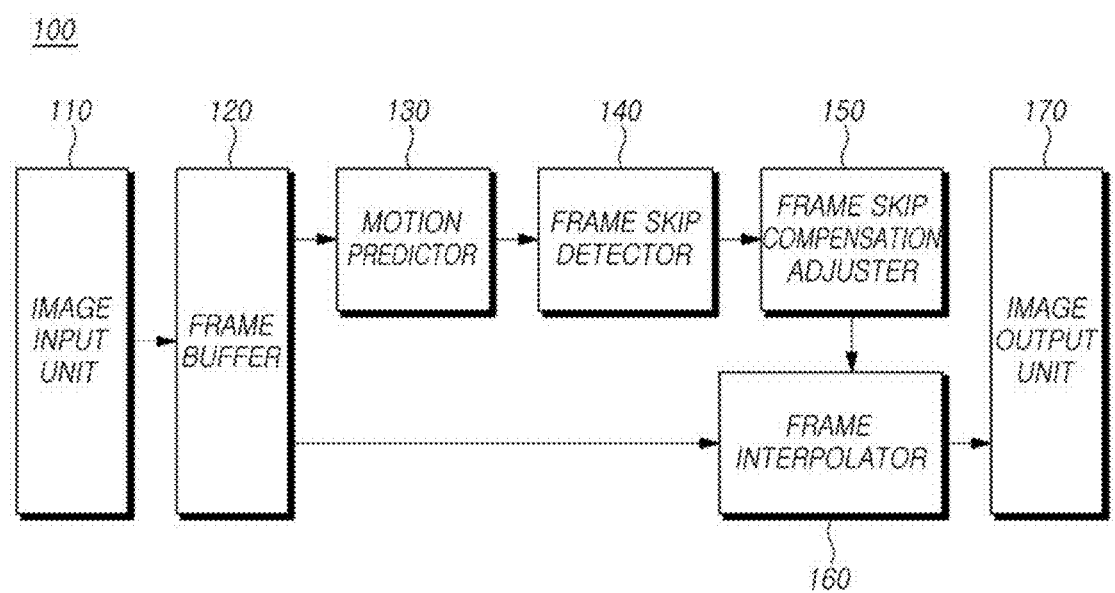
FIG. 1 illustrates a display device according to an embodiment of the disclosure.

For use in embodiments of disclosure, common terms widely used as possible have been chosen considering functions in the disclosure, but the terms may be varied depending on the intent of one of ordinary skill in the art or case laws or the advent of new technologies. In certain cases, some terms may be arbitrarily selected by the applicant, and in such case, their detailed definitions may be given in the relevant parts thereof. Accordingly, the terms used herein should be determined based on their meanings and the overall disclosure, rather than by the terms themselves.

The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. The functionality associated with any particular controller may be centralized or distributed, whether locally or remotely. The phrase "at least one of,"

when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. The expression "at least one of a, b, or c" may indicate only a, only b, only c, both a and b, both a and c, both b and c, all of a, b, and c, or variations thereof. Similarly, the term "set" means one or more. Accordingly, the set of items may be a single item or a collection of two or more items.

Further, the terms "unit," "module," or "part" as used herein denote a unit processing at least one function or operation, and a unit, module, or part may be implemented in hardware, software, or a combination thereof. The embodiments may be described and illustrated in terms of blocks, as shown in the drawings, which carry out a described function or functions. These blocks, which may be referred to herein as an image input unit, a motion predictor, a frame skip detector, a frame skip compensation adjuster, a frame interpolator, an image output unit, or the like may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein). The circuits may, for example, be embodied in one or more semiconductor chips, or on substrate supports such as printed circuit boards and the like. Circuits included in a block may be implemented by dedicated hardware, or by at least one processor (e.g., one or more programmed microprocessors and associated circuitry), or by a combination of dedicated hardware to perform some functions of the block and a processor to perform other functions of the block. The at least one processor includes or corresponds to circuitry like a central processing unit (CPU), a microprocessor unit (MPU), an application processor (AP), a coprocessor (CP), a system-on-chip (SoC), or an integrated circuit (IC). Each block of the embodiments may be physically separated into two or more interacting and discrete blocks. Likewise, the blocks of the embodiments may be physically combined into more complex blocks.

Embodiments of the disclosure are now described with reference to the accompanying drawings in such a detailed manner as to be easily practiced by one of ordinary skill in the art. However, the disclosure may be implemented in other various forms and embodiments of the disclosure are not limited to the embodiments set forth herein. In the drawings, the same reference numerals refer to the same elements, and the size of each component in the drawings may be exaggerated for clarity of description.

FIG. 1 is a block diagram schematically illustrating a display device according to an embodiment of the disclosure.

Referring to FIG. 1, the display device 100 may include an image input unit 110, a frame buffer 120, a motion predictor 130, a frame skip detector 140, a frame skip compensation adjuster 150, a frame interpolator 160, and an image output unit 170. The display device 100 may further include an image compressor and a frame rate conversion detector. The frame buffer 120 may be implemented as various types of memory, and the display device 100 may include additional components other than the illustrated components, or at least one of the illustrated components may be omitted.

According to an embodiment, the image input unit 110 may receive an image signal. The image signal may be received from the outside of the display device 100 or may be embedded in the display device 100. The display device 100 may receive the image signal from the outside in a wired or wireless manner image signal.

According to an embodiment, the frame buffer 120 may store frames of the According to an embodiment, the motion predictor 130 may predict motion information by determining a motion vector that is a displacement between the t−1 time frame and the t time frame obtained from the frame buffer 120.

The motion predictor 130 may predict a motion vector field (MVF) for all the input frames by finding a block of a t−1 time frame where the matching cost function is minimized for each image block of the t time frame and obtaining a motion vector that is a displacement thereof. The matching cost function may include an item reflecting likelihood between image blocks and an item reflecting confidence of the motion vector field such as smoothness constraint. The likelihood between the image blocks may be reflected using a method such as sum of absolute difference (SAD), sum of squared difference (SSD), normalized cross correlation (NCC), or the like, but it will be obvious to those skilled in the art that other methods may be used. Because adjacent blocks in the image belonging to the same object show similar motions in a general image, the motion predictor 130 may not only predict the MVF using the likelihood between the blocks, but also allows the MVF to have smooth characteristics by additionally considering the smoothness constraint, thereby reducing errors in motion information prediction.

According to an embodiment, the frame skip detector 140 may detect a frame skip in the image signal. For example, ABCDEF frames may be regarded as normal images without frame skip, and ABCCEF frames may be regarded as images where a frame skip occurs in the second C frame. In this case, when the case of moving using the difference between the current frame and the previous frame is indicated as 1 and the case of stopping is indicated as 0, the ABCCEF frames may be indicated as 111011. As such, a point where the surrounding area becomes 1 and the corresponding position becomes 0 may be detected as a frame where frame skip has occurred.

The frame skip detector 140 may detect the frame skip by analyzing whether the t time frame currently input and the t−1 time frame input immediately before are the same. Specifically, when the sum (sum of absolute difference (SAD)) of absolute values of all pixels in the difference image between the t−1 time frame and the t time frame is a predetermined reference value or less, the frame skip detector 140 may determine that the t−1 time frame and the t time frame are the same. In this case, the frame skip detector 140 may determine a section between the t−1 time frame and the t time frame as a still section. It is obvious to one of ordinary skill in the art that the frame skip detector 140 may use various algorithms such as an algorithm considering noise components in addition to the SAD to determine whether the frames are the same.

According to an embodiment, even if it is determined that the two consecutive frames are the same as described above, a still image may be actually input, and thus frame skip may not always occur. Accordingly, when one still section is mixed in the moving section, the frame skip detector 140 may determine the corresponding still section as the section where the frame skip occurs. To that end, the frame skip detector 140 may detect whether there is a frame skip by referring to a result of determining whether the previous frames are the same. Specifically, when the section between the t−2 time frame and the t−1 time frame is determined as the moving section and the section between the t−1 time frame and the t time frame is determined as the still section, the frame skip detector 140 may detect the input frame at the t time point as the skipped frame.

According to an embodiment, when the still image is actually input immediately after the scene is switched, the frame skip detector 140 may further determine that no frame skip occurs. In general, when a scene switch occurs, the value of the matching cost function is very large no matter which motion vector is selected during the matching process by the motion predictor 130, and thus the frame skip detector 140 may detect whether the scene is switched using the same. When a scene switch occurs between the t−2 time frame and the t−1 time frame and a still image is actually input from the t−1 time frame, the frame skip detector 140 may not determine the t time frame as a skipped frame even if it is determined that the t−1 time frame and the t time frame are the same.

According to an embodiment, when the motion of the input image has an SAD near a predetermined reference value for determining whether the motion of the input image is stopped, the difference between the t−2 time frame and the t−1 time frame may slightly exceed the reference value, and the difference between the t−1 time frame and the t time frame may be slightly smaller than the reference value. In this case, the frame skip detector 140 may set two reference values for determining whether the frames are the same frame (the first reference value>the second reference value) to prevent false detection. When the SAD between frames is greater than the first reference value, the frame skip detector 140 may determine that the frames are not the same frame, when the SAD between frames is smaller than the second reference value, the frame skip detector 140 may determine that the frames are the same frame, and when the SAD between frames is between the first reference value and the second reference value, the frame skip detector 140 may not determine whether the frames are the same frame. Accordingly, the frame skip detector 140 may detect only when the motion definitely stops instantaneously as a frame skip.

According to an embodiment, when the frame skip detector 140 detects the t time frame as the skipped frame, the frame skip detector 140 may determine the identity with the t−1 time frame or may determine the identity with the t time frame to determine whether the t+1 time frame is skipped. When determining the identity with the t−1 time frame, at least two frames prior to the t+1 time frame should be further stored. On the other hand, when determining the identity with the t time frame, continuous frame skip detection may be possible even if only one frame prior to the t+1 time frame is stored.

According to an embodiment, the frame skip compensation adjuster 150 may determine information indicating whether to perform frame interpolation, interpolation input frame information (first interpolation input frame information and second interpolation input frame information), and an interpolation time, based on a result of frame skip detection by the frame skip detector 140, and may provide the information indicating whether to perform frame interpolation, the interpolation input frame information, and the interpolation time to the frame interpolator 160. The interpolation input frame information may indicate position information of a location where each of the interpolation input frames is stored in the frame buffer. Further, the frame skip compensation adjuster 150 may adaptively determine the amount of frame delay of the display device 100 based on the frequency of occurrence of the frame skip. When the frame skip compensation adjuster 150 changes the amount of frame delay, the amount of frame delay may be changed when the image signal is a still section. A method for adaptively determining the amount of frame delay by the frame skip compensation adjuster 150 and a time when the amount of frame delay is changed are described below in detail with reference to FIG. 8.

According to an embodiment, when the frame delay is 1 frame and the frame skip does not occur, the frame skip compensation adjuster 150 may determine the t−1 time frame as the first interpolation input frame information, may determine the information indicating whether to perform frame interpolation, which indicates not to perform frame interpolation, and may provide the same information to the frame interpolator 160. In this case, the frame interpolator 160 may provide the t−1 time frame to the image output unit 170 without performing frame interpolation, and the image output unit 170 may output the t−1 time frame. When the frame delay increases to two frames and the frame skip does not occur, the frame skip compensation adjuster 150 may determine the t−2 time frame as the first interpolation input frame information, determine the information indicating whether to perform frame interpolation, which indicates not to perform frame interpolation, and provide the same information to the frame interpolator 160.

When a frame skip occurs, the frame skip compensation adjuster 150 may determine the information indicating whether to perform frame interpolation, which indicates to perform frame interpolation, determine interpolation input frame information (first interpolation input frame information and second interpolation input frame information) and an interpolation time, and provide the same to the frame interpolator 160.

For example, when the frame delay is 1 frame and the frame skip is detected in the t−1 time frame, the frame skip compensation adjuster 150 may determine the t−1 time frame as the first interpolation input frame information and the t time frame as the second interpolation input frame information, and determine the ½ position as the interpolation time. For example, when the frame delay of the system is 1 frame and the frame skip pattern is ABCCEF, because the frame skip is detected in the second C frame and the frame E is input at the time of outputting the second C frame, the frame skip compensation adjuster 150 may determine the second C frame, which is the skipped frame, as the first interpolation input frame information and the E frame as the second interpolation input frame information, determine a half time (½ time) of the second C frame and the E frame as the interpolation time, and provide the same to the frame interpolator 160. The frame interpolator 160 may generate the output frame pattern ABCD'EF and remove the motion judder by generating the D' frame at the ½ time of the second C frame which is the skipped frame and the E frame as an interpolation frame and interpolating the same at the position of the second C frame.

As another example, when two consecutive frame skips occur, the frame delay of the system should be set to at least two frames. When the frame delay is 2 frames and the frame skips are consecutively detected at the t−2 time and the t−1 time, at the t−2 time, the frame skip compensation adjuster 150 may determine the t−2 time frame as the first interpolation input frame information and the t time frame as the second interpolation input frame information and determine the ⅓ position as the interpolation time. At the t−1 time, the frame skip compensation adjuster 150 may determine the t–2 time frame as the first interpolation input frame information and the t time frame as the second interpolation input frame information, and determine the ⅔ position as the interpolation time.

In the above-described manner, the frame skip compensation adjuster 150 may also process three or more consecutive frame skips.

According to an embodiment, the frame skip compensation adjuster 150 may determine whether a frame input after at least one repeated frame due to a skip is a delayed frame, and may determine interpolation input frame information and an interpolation time based on the determination result. A method for determining whether a frame input after the at least one repeated frame is a delayed frame is described below in detail with reference to FIGS. 2 to 6.

According to an embodiment, when changing a frame rate of the image signal based on an external input, the frame skip compensation adjuster 150 may determine the interpolation input frame and the interpolation time based on the changed frame rate. For example, when the 60 Hz frame rate input image is converted to the 120 Hz frame rate, the frame skip compensation adjuster 150 may output the 120 Hz image by inserting an interpolation image of ½ time between input frames. In this case, when the frame skip occurs in the input image, the frame rate change may be performed while simultaneously removing the motion judder caused by the frame skip by adjusting the frame interpolation time at the corresponding position. For example, in the case of an input frame pattern such as ABCCEF, the frame skip compensation adjuster 150 may generate an interpolation frame at the ½ time between A and B and between B and C, and may generate interpolation frames at ¼, ²⁄₄, and ¾ times of C and E between the first C and E at output times corresponding to C, C, and E, respectively. This is the same as applying the ½ interpolation time for frame rate change again to the ²⁄₄ time interpolation frame generated to compensate for frame skip.

According to an embodiment, the display device 100 may further include a frame rate change detector. When the input image signal is a frame rate-changed image signal, the frame skip compensation adjuster 150 may detect a frame rate change and generate a key frame with duplicate frames removed. In this case, the frame skip compensation adjuster 150 may determine an interpolation input frame and an interpolation time based on the key frame. For example, when an image changed from a 30 Hz frame rate image to have a 60 Hz frame rate is input, it may have a frame pattern in which every two frames are duplicated, such as AABBCCDD. The frame rate change detector may detect such frame rate change and generate key frames including the A, B, C, and D frames. Based on the key frame, the frame skip compensation adjuster 150 may perform frame skip detection, frame skip compensation, and frame rate change as described above.

According to an embodiment, the frame interpolator 160 may generate an interpolation frame corresponding to the interpolation time, based on the information indicating whether to perform frame interpolation, the interpolation input frame information (the first interpolation input frame information and the second interpolation input frame information), and the interpolation time received from the frame skip compensation adjuster 150. The frame interpolator 160 may receive interpolation input frames stored in the frame buffer using the interpolation input frame information. The frame interpolator 160 may generate an interpolation frame by projecting each pixel of the first interpolation input frame corresponding to the first interpolation input frame information and the second interpolation input frame corresponding to the second interpolation input frame information to the position corresponding to the interpolation time using the motion vector. In terms of each pixel of the interpolation frame, several pixels may be projected from the first interpolation input frame and the second interpolation input frame, or no pixel may be projected and thus may be empty. The frame interpolator 160 may reflect multiple pixels to each pixel of the interpolation frame using various methods such as averaging multiple pixel values or selectively reflecting pixels using the reliability of each pixel. In particular, in an occluded area where an object disappears or appears, selective pixel reflection may enhance the quality of the resulting image. Further, the frame interpolator 160 may fill the portion which is empty as no pixel is projected by using inpainting technique or using a filter.

According to an embodiment, the image output unit 170 may output an image signal including the interpolation frame corresponding to the interpolation time.

The operation of the image compressor is described below with reference to FIG. 8.

According to the instant embodiment, the display device 100 may detect a frame skip in an image generation process or an image transmission process and compensate for (or interpolate) the frame with an image with an appropriate movement in real-time, thereby outputting a smooth, motion judder-free image.

Further, according to the instant embodiment, the display device 100 may adaptively adjust the amount of frame delay according to the characteristics of the input image, thereby processing continuous frame skips and efficiently controlling the delay time between input/output images and the amount of frame buffer required for frame delay.

Further, according to the instant embodiment, the display device 100 may analyze the characteristics of a movement in an image, thereby removing motion judder even in an image where a complicated pattern of frame skip occurs, such as mixed occurrence of a repeated frame input and a delayed frame input in the frame skip section.

Figure 2:
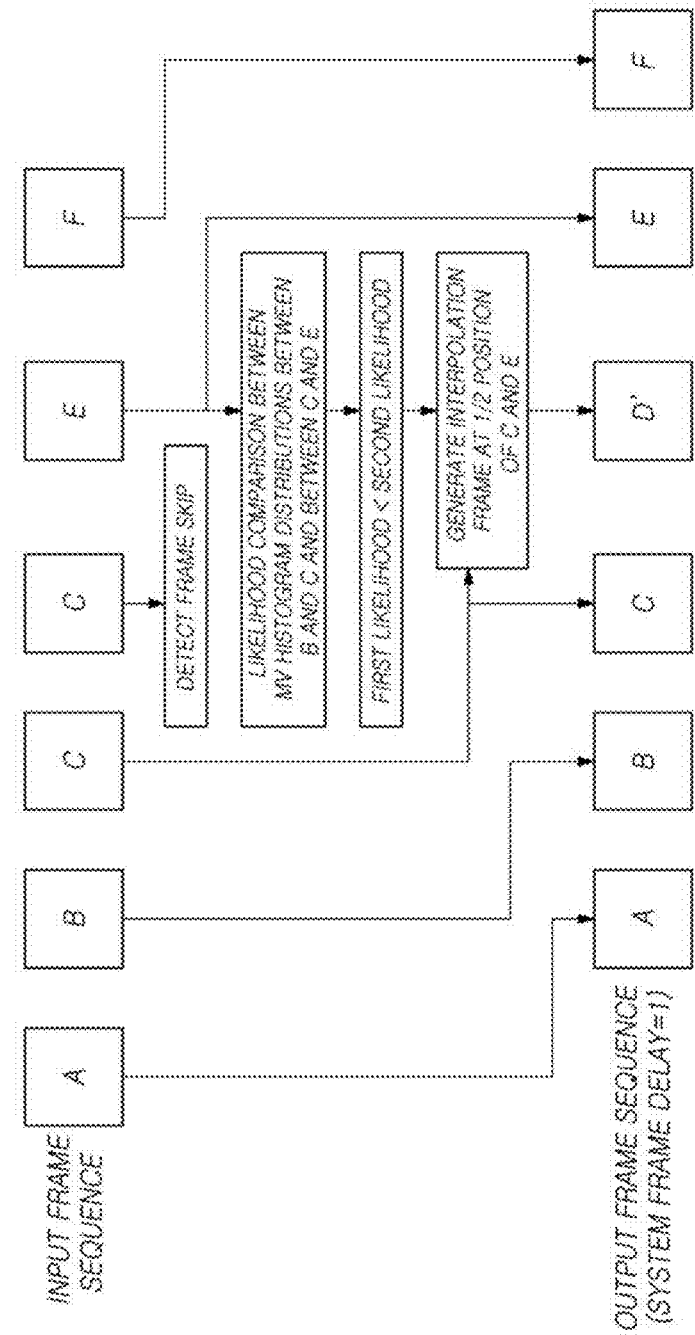
FIGS. 2 and 3 illustrate a method for determining whether a frame input after one frame skip is a delayed frame by a frame skip compensation adjuster according to an embodiment of the disclosure.
Figure 3:
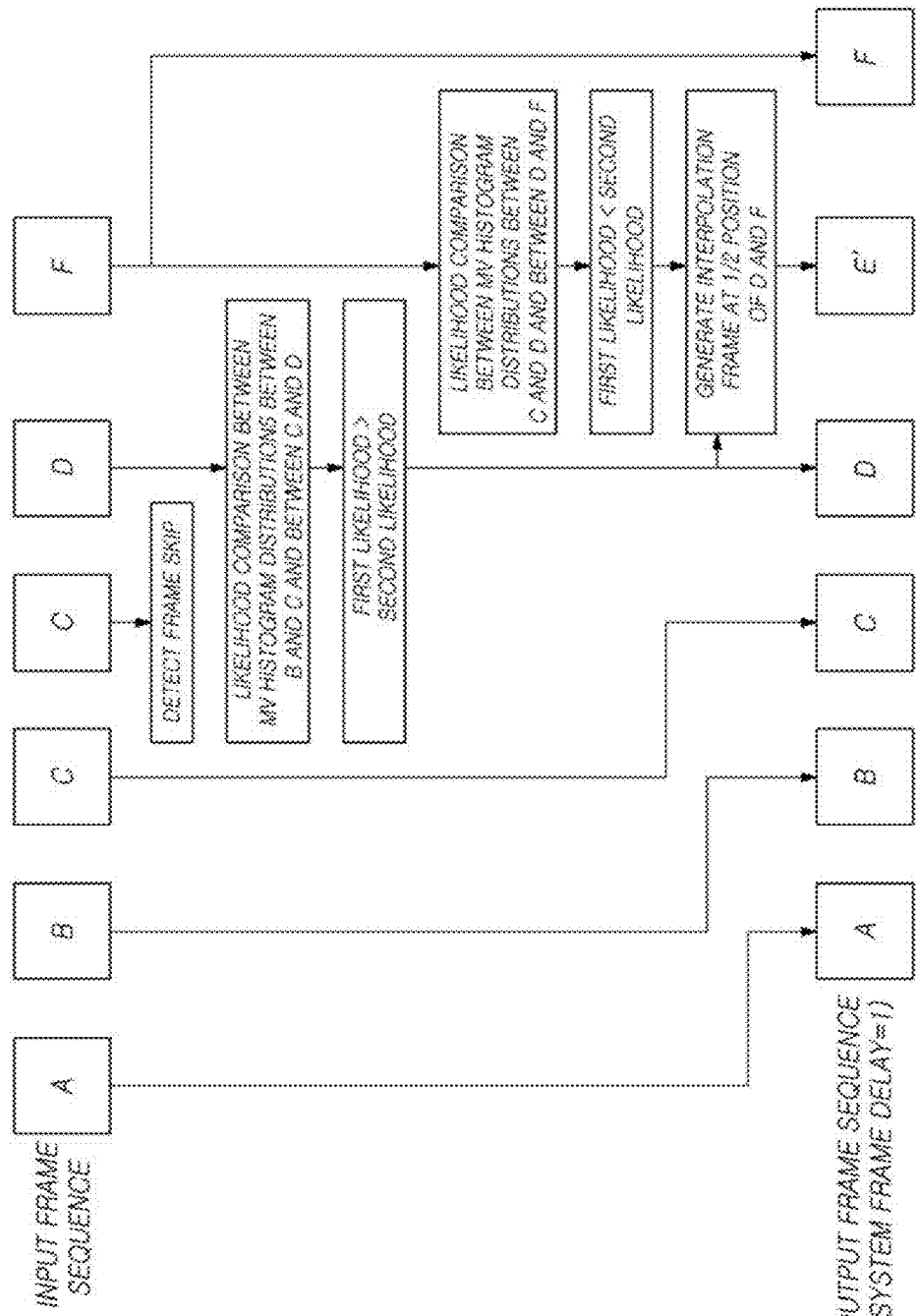

FIGS. 2 and 3 are exemplarily illustrating a method for determining whether a frame input after one frame skip is a delayed frame by a frame skip compensation adjuster according to an embodiment of the disclosure.

FIG. 2 illustrates an example where a delayed frame is not input after one frame skip occurs and an input frame is repeated. In the illustrated example, in the case of an input image having a frame pattern such as ABCCEF, all other frames than the fourth frame (the second C frame) which is the repetition of the previous frame (first C frame) due to an occurrence of a frame skip are input without delay. In this case, since the first C frame and the E frame are input at a normal time, the frame skip compensation adjuster 150 may generate a D' frame, which is an interpolation frame, at the position of the fourth frame (the second C frame), which is a skipped frame.

FIG. 3 illustrates an example where a delayed frame is input after one frame skip occurs and an input frame is repeated. In the illustrated example, in the case of an input image having a frame pattern such as ABCCDF, a delayed frame (D frame) is input after the fourth frame (second C frame) repeated by the frame skip. In this case, if a frame c, which is a ½ position frame of C and D, is generated as an interpolation frame at the position of the second C frame, such as ABCcDF, without determining whether the frame is a delayed frame, a frame skip still exists between D and F, and thus a motion judder may occur. Accordingly, the frame skip compensation adjuster 150 needs to determine whether a frame input after at least one repeated frame is a delayed frame due to a skip.

According to an embodiment, the frame skip compensation adjuster 150 may compare a likelihood between the histogram distribution of the motion vector between two frames before the skipped frame and the histogram distribution of the motion vector between at least one repeated frame due to the skip and frames input after the at least one repeated frame and determine whether the frame input after the at least one repeated frame is a delayed frame based on the comparison result. The frame skip compensation adjuster 150 may determine the interpolation input frame information and the interpolation time, based on determining whether the frame is the delayed frame. Methods of comparing the likelihood between histogram distributions include correlation, chi-square, intersection, Bhattacharyya distance, etc., but it is obvious to those skilled in the art that various other methods may be used.

Referring to FIG. 3, in the case of an input image having an ABCCDF frame pattern, the frame skip compensation adjuster 150 may compare the likelihood between the histogram distribution of the motion vector between frame B and frame C, which are two frames before the skipped frame, and the histogram distribution of the motion vector between frame C repeated due to the frame skip and frame D delayed, thereby outputting frame D at the time when the second frame C is to be output. Specifically, for the input frame pattern of the ABCCDF, the frame skip compensation adjuster 150 may calculate a first likelihood between the histogram distribution of the motion vector between frame B and frame C and the histogram distribution of the motion vector between frame C and frame D. Further, the frame skip compensation adjuster 150 may calculate a second likelihood between the histogram distribution of the motion vector obtained by doubling the size of the motion vector between frame B and frame C and the histogram distribution of the motion vector between frame C and frame D. In the ABCCDF input frame pattern of FIG. 3, the relationship of 'first likelihood>second likelihood' (i.e., the first likelihood is more similar than the second likelihood) is established, but in the ABCCEF input frame pattern of FIG. 2, the relationship of 'first likelihood<second likelihood' is established.

As illustrated in FIG. 2, in the relationship of 'first likelihood<second likelihood', the frame skip compensation adjuster 150 may generate the D' frame at the ½ position of frame C and frame E, as an interpolation frame, at the frame skip position (second C frame).

As illustrated in FIG. 3, in the relationship of 'first likelihood>second likelihood', the frame skip compensation adjuster 150 may output the frame D at the time of outputting the second C frame. In this case, since a frame at a delay time different from the previous system frame delay is output, the system frame delay state is not yet normal. Accordingly, the frame skip compensation adjuster 150 may calculate a first likelihood between the histogram distribution of the motion vector between frame C and frame D and the histogram distribution of the motion vector between frame D and frame F. Further, the frame skip compensation adjuster 150 may calculate a second likelihood between the histogram distribution of the motion vector obtained by doubling the size of the motion vector between frame C and frame D and the histogram distribution of the motion vector between frame D and frame F. In this case, since 'first likelihood<second likelihood' is established, the frame skip compensation adjuster 150 may generate the frame E', which is at the ½ position of the frame D and the frame F, as interpolation frame at the frame D position. As the frame F is output at the next time, all delays of the input frame may be resolved.

Figure 4:
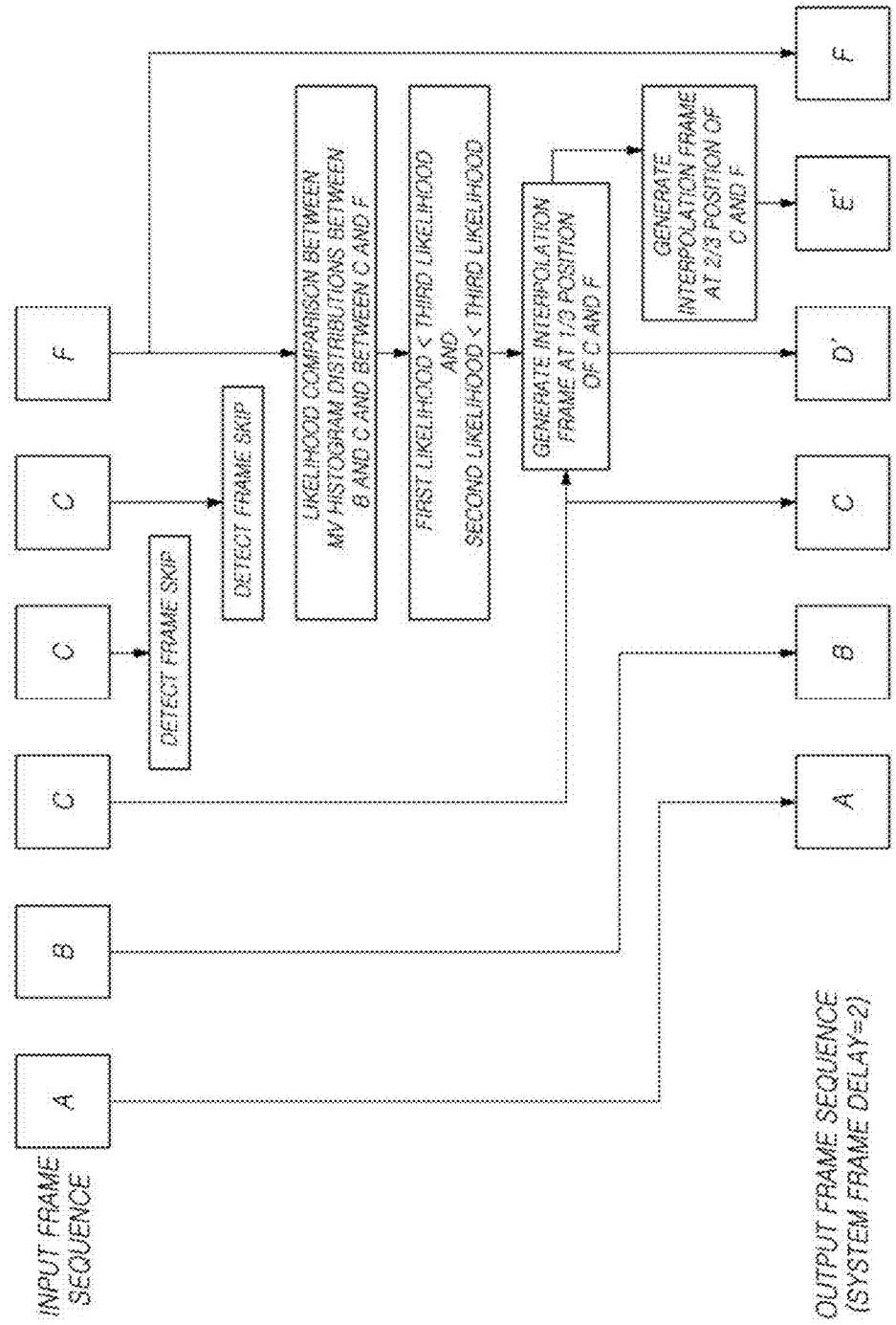
FIGS. 4 to 6 illustrate a method for determining whether a frame input after two consecutive frame skips is a delayed frame by a frame skip compensation adjuster according to an embodiment of the disclosure.
Figure 5:
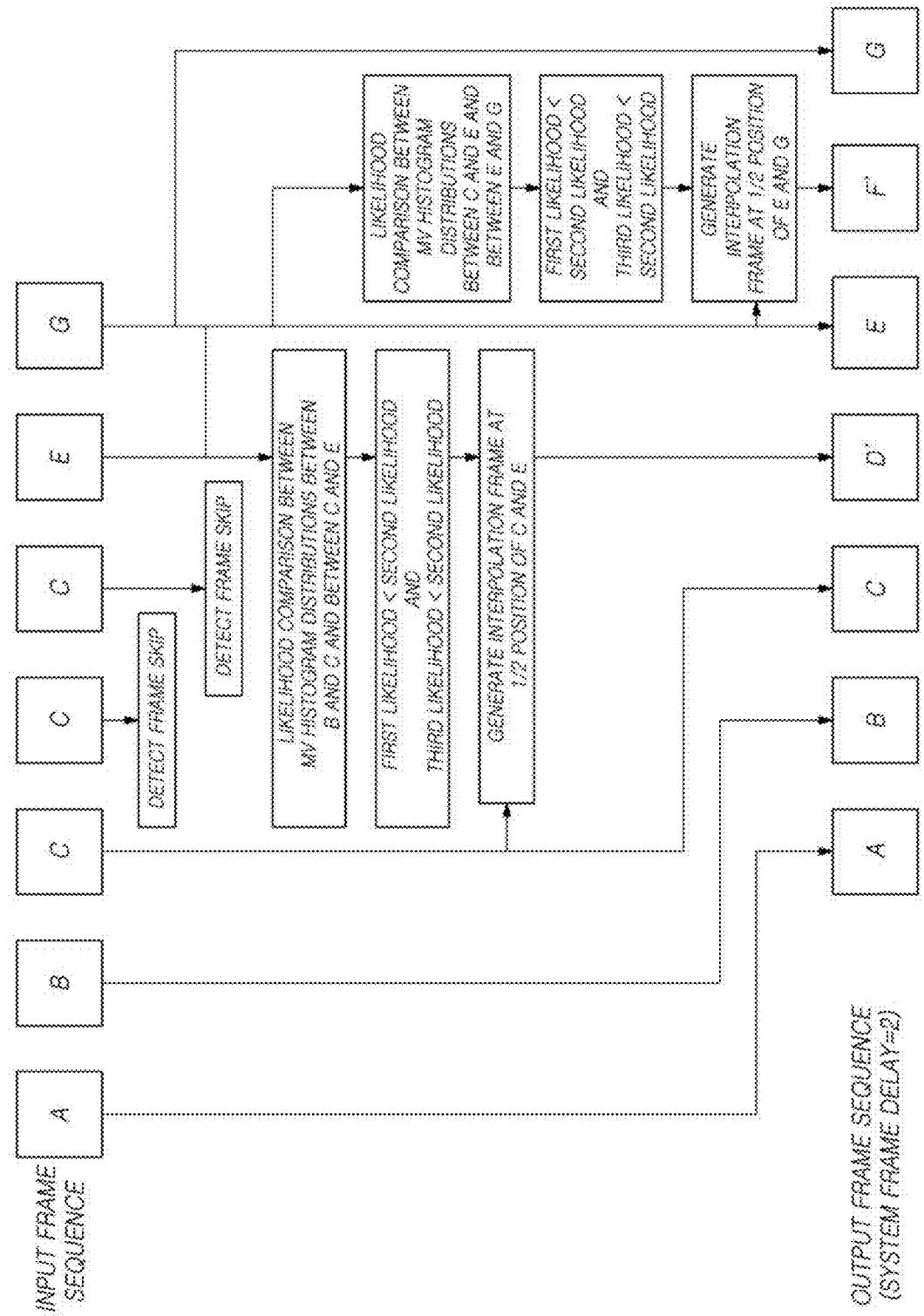
Figure 6:
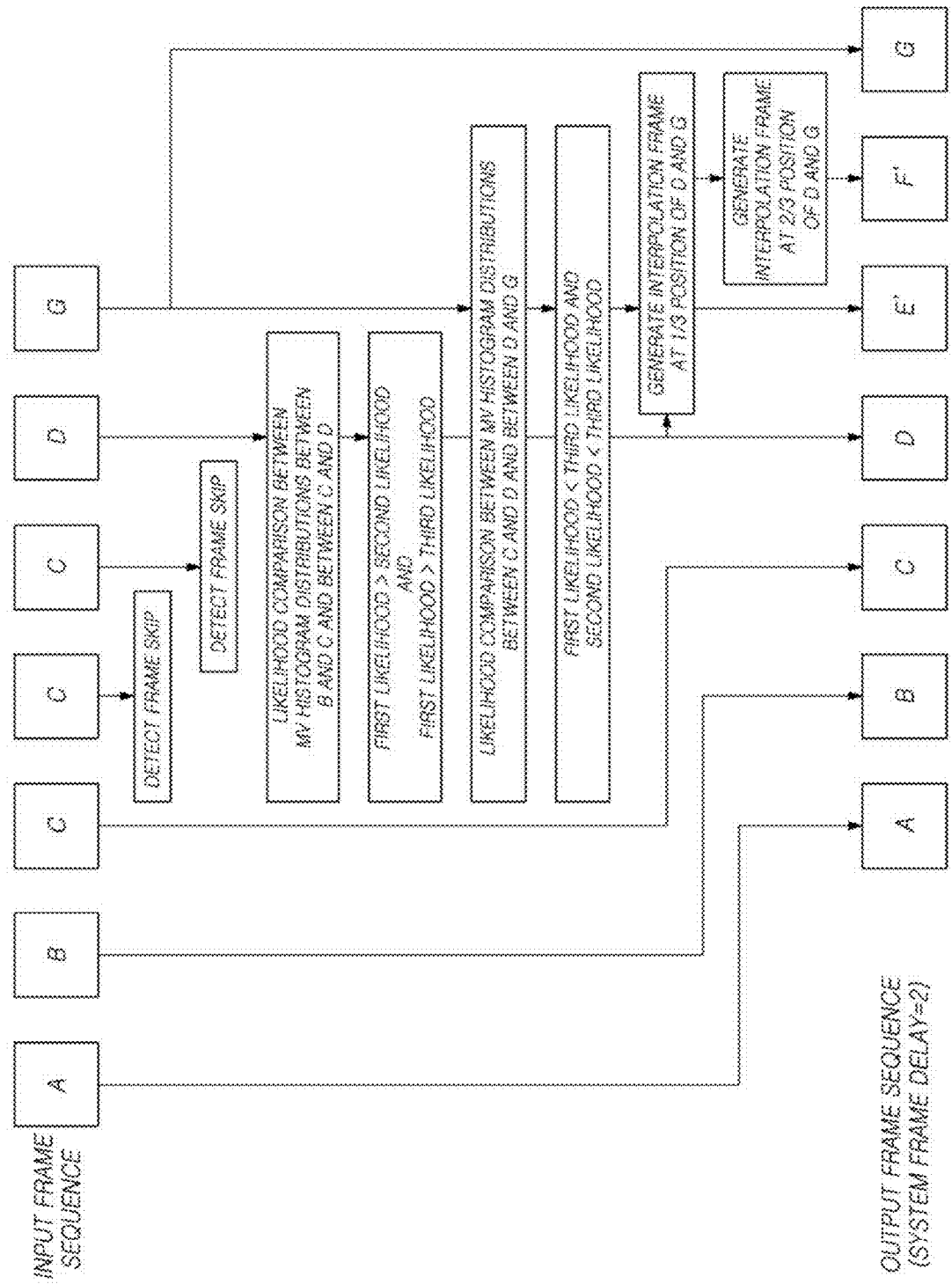

FIGS. 4 to 6 are exemplarily illustrating a method for determining whether a frame input after two consecutive frame skips is a delayed frame by a frame skip compensation adjuster according to an embodiment of the disclosure.

FIG. 4 illustrates an example where a delayed frame is not input after two consecutive frame skips occur and an input frame is repeated. In the illustrated example, in the case of an input image having the ABCCCF frame pattern, the frame skip compensation adjuster 150 may calculate a first likelihood between the histogram distribution of the motion vector between frame B and frame C, which are two frames before the skipped frame, and the histogram distribution of the motion vector between frame C, which is the repeated frame due to the skip, and frame F. Further, the frame skip compensation adjuster 150 may calculate a second likelihood between the histogram distribution of the motion vector obtained by doubling the size of the motion vector between frame B and frame C and the histogram distribution of the motion vector between frame C and frame F. Further, the frame skip compensation adjuster 150 may calculate a third likelihood between the histogram distribution of the motion vector obtained by tripling the size of the motion vector between frame B and frame C and the histogram distribution of the motion vector between frame C and frame F. Since the third likelihood is the largest among the first likelihood, the second likelihood, and the third likelihood, the frame skip compensation adjuster 150 may determine that the frame pattern is the same as ABCCCF. Accordingly, the frame skip compensation adjuster 150 may generate the D' frame and the E' frame at the ⅓ and ⅔ positions of C and F as interpolation frames at the times of outputting the second and third C frames, respectively.

FIG. 5 illustrates an example where a delayed frame is input after two consecutive frame skips occur and an input frame is repeated. In the illustrated example, in the case of an input image having the ABCCEG frame pattern, the frame skip compensation adjuster 150 may calculate a first likelihood between the histogram distribution of the motion vector between frame B and frame C, which are two frames before the skipped frame, and the histogram distribution of the motion vector between frame C, which is the repeated frame due to the skip, and frame E. Further, the frame skip compensation adjuster 150 may calculate a second likelihood between the histogram distribution of the motion vector obtained by doubling the size of the motion vector between frame B and frame C and the histogram distribution of the motion vector between frame C and frame E. Further, the frame skip compensation adjuster 150 may calculate a third likelihood between the histogram distribution of the motion vector obtained by tripling the size of the motion vector between frame B and frame C and the histogram distribution of the motion vector between frame C and frame E. Since the second likelihood is the largest among the first likelihood, the second likelihood, and the third likelihood, the frame skip compensation adjuster 150 may determine that the frame pattern is the same as ABCCCE. Accordingly, the frame skip compensation adjuster 150 may generate the D' frame, which is at the ½ position of the frame C and the frame E, as the interpolation frame at the second C frame position.

Further, the frame skip compensation adjuster 150 may repeat the three likelihood calculations using the next frame. In other words, the frame skip compensation adjuster 150 may calculate a first likelihood between the histogram distribution of the motion vector between frame C and frame E and the histogram distribution of the motion vector between frame E and frame G. Further, the frame skip compensation adjuster 150 may calculate a second likelihood between the histogram distribution of the motion vector obtained by doubling the size of the motion vector between frame C and frame E and the histogram distribution of the motion vector between frame E and frame G. Further, the frame skip compensation adjuster 150 may calculate a third likelihood between the histogram distribution of the motion vector obtained by tripling the size of the motion vector between frame C and frame E and the histogram distribution of the motion vector between frame E and frame G. Since the second likelihood is the largest among the first likelihood, the second likelihood, and the third likelihood, the frame skip compensation adjuster 150 may generate the frame F', which is at the ½ position of the frame E and the frame G, as the interpolation frame at the input frame E position.

FIG. 6 illustrates another example where a delayed frame is input after two consecutive frame skips occur and an input frame is repeated. In the illustrated example, in the case of an input image having the ABCCCDG frame pattern, the frame skip compensation adjuster 150 may calculate a first likelihood between the histogram distribution of the motion vector between frame B and frame C, which are two frames before the skipped frame, and the histogram distribution of the motion vector between frame C, which is the repeated frame due to the skip, and frame D. Further, the frame skip compensation adjuster 150 may calculate a second likelihood between the histogram distribution of the motion vector obtained by doubling the size of the motion vector between frame B and frame C and the histogram distribution of the motion vector between frame C and frame D. Further, the frame skip compensation adjuster 150 may calculate a third likelihood between the histogram distribution of the motion vector obtained by tripling the size of the motion vector between frame B and frame C and the histogram distribution of the motion vector between frame C and frame D. Since the first likelihood is the largest among the first likelihood, the second likelihood, and the third likelihood, the frame skip compensation adjuster 150 may determine that the frame pattern is the same as ABCCCD. Accordingly, the frame skip compensation adjuster 150 may generate frame D at the second C frame position. Then, the three likelihood calculations may be repeated using the next frame.

Figure 7:
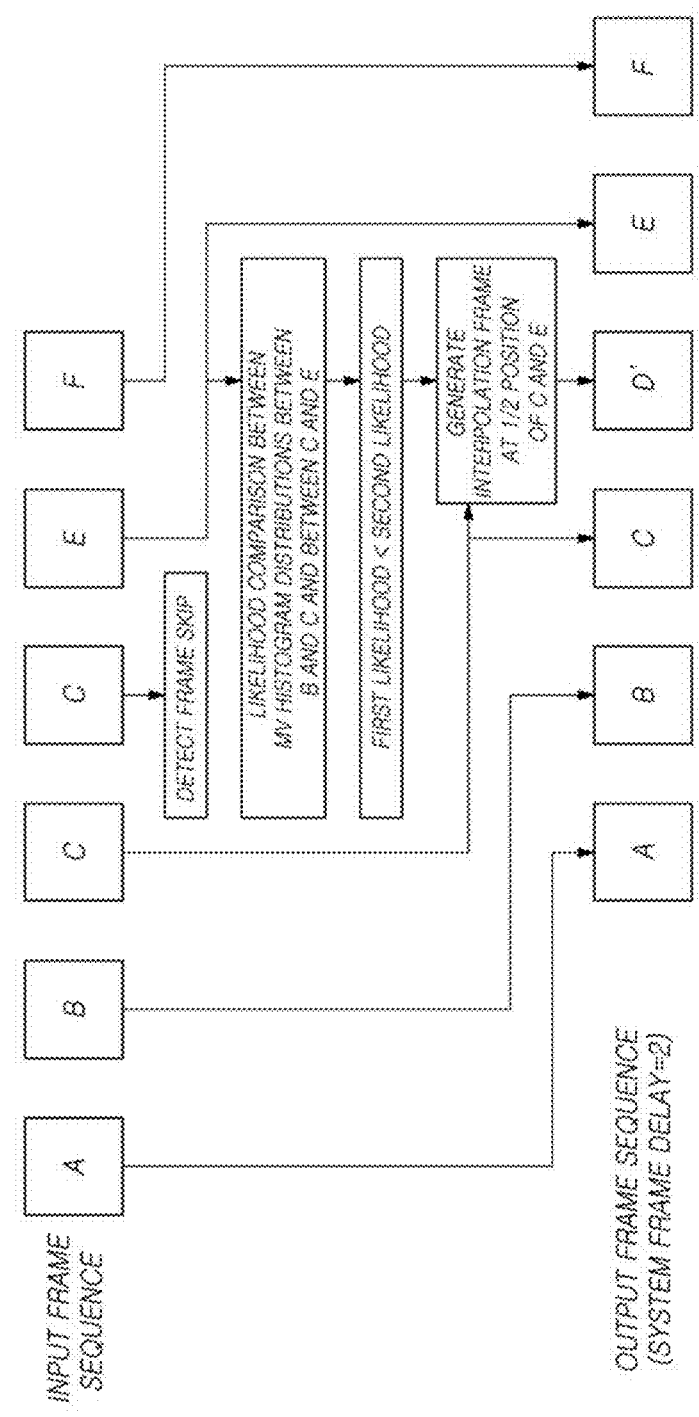
FIG. 7 illustrates the amount of frame delay required for compensating for a frame skip according to an embodiment of the disclosure.

FIG. 7 exemplarily illustrates the amount of frame delay required for compensating for a frame skip according to an embodiment of the disclosure.

Referring to FIG. 7, when a frame skip is detected by the frame skip detector 140, the frame interpolator 160 removes the skipped frame and generates an interpolation frame. In the case of an image where a frame skip has occurred, such as ABCCEF, the frame interpolator 160 may remove the skipped second C frame and generate the D' frame, which is at the ½ position of the C frame and the E frame, as an interpolation frame. The C frame and the E frame are frames before and after the removed frame respectively. The image output unit 170 may output the D' frame instead of the second C frame. As a result, the image output unit 170 may output the ABCD'EF frames, so that the motion judder generated in the CC frame section may be removed and a smooth motion may be exhibited.

As described above, in order to process frame skip compensation in real-time, a frame delay is required between the input image and the output image of the display device. This is because the E frame input is required to output the D' frame, which is at the ½ position of the C frame and the E frame, and thus the D' frame may be output only when the whole or part of the E frame is input. While frame E is input, an interpolation frame D' is generated using the motion vector histogram distribution between frame C and frame E. To that end, it may be determined that the currently input frame is frame E, not frame D, using the whole or part of the first input E frame.

When a portion of an image (e.g., an upper end of the image) is used for likelihood comparison between the histogram distributions of the motion vectors, if there is one frame skip, the display device 100 requires at least one frame delay to compensate for the frame skip. If the number of consecutive frame skips is two, the display device 100 requires at least two frame delays to compensate for the two frame skips. Similarly, to process N consecutive frame skips, the display device 100 needs at least N frame delays.

When the whole of an image is used for likelihood comparison between the histogram distributions of the motion vectors, if there is one frame skip, the display device 100 requires at least two frame delays to compensate for the frame skip. In this case, referring to FIG. 7, in order to output the frame D', which is at the ½ position of the frame C and the frame E, the entire frame E needs to be input, and thus the display device 100 needs at least two frame delays. Similarly, to process N consecutive frame skips, the display device 100 needs at least N+1 frame delays.

Figure 8:
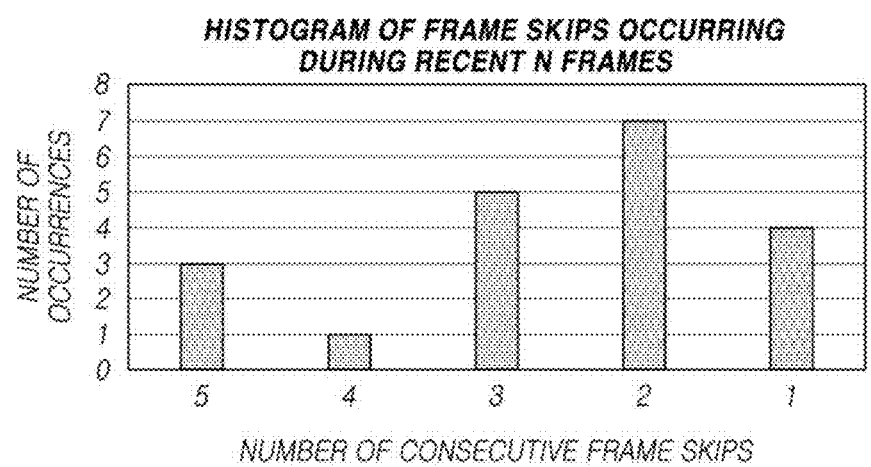
FIG. 8 illustrates a method for adaptively determining the amount of frame delay by a frame skip compensation adjuster according to an embodiment of the disclosure.

FIG. 8 exemplarily illustrates a method for adaptively determining the amount of frame delay by a frame skip compensation adjuster according to an embodiment of the disclosure.

According to an embodiment, the frame skip compensation adjuster 150 may adaptively determine the amount of frame delay of the display device 100 based on the frequency of occurrence of the frame skip of the image signal. The amount of frame delay may determine the maximum number of consecutive frame skips that may be processed. According to an embodiment, it is possible to process, in real-time, irregular consecutive frame skips without fixedly increasing the usage of the frame buffer (or memory) or the delay time between the input image and the output image by adaptively determining the amount of frame delay considering the frequency of occurrence of the frame skip of the image signal.

Referring to FIG. 8, the frame skip compensation adjuster 150 may store a histogram of frame skips occurring during recent N frames. Histogram refers to a graph indicating the frequency distribution, and the class may be displayed on the x-axis and the frequency, which is a numerical value of data corresponding to each class, may be displayed on the y-axis. In the illustrated example, the class of the histogram may be the number of consecutively occurring frame skips, and the frequency may be the number of occurrences of frame skips of each class.

The frame skip compensation adjuster 150 may determine the amount of frame delay to be proportional to the number of consecutive frame skips generated during the recent N frames. As one method for this, the frame skip compensation adjuster 150 may determine the maximum value of the number of consecutive frame skips in the histogram as the amount of frame delay. In the illustrated example, 5 which is the maximum number of consecutive frame skips generated during the recent N frames may be determined as the amount of frame delay. As another method, the frame skip compensation adjuster 150 may determine the maximum value among classes where the frequency of occurrence is greater than or equal to a predetermined number of times in the histogram as the amount of frame delay. In this case, the frame delay may be determined as the number of consecutive frame skips that occur more than a predetermined frequency. In the illustrated example, class 3, which is the maximum value of class 3 and class 2 having an occurrence frequency of five or more times, i.e., 3 which is the number of consecutive frame skips, may be determined as the amount of frame delay.

When the frame delay is changed, the frame skip detector 140 may change the first interpolation input frame information and the second interpolation input frame information provided to the frame interpolator 160. For example, when the frame delay increases from one frame to two frames, the frame skip detector 140 may change the first interpolation input frame information from the t−1 time frame to the t−2 time frame. Conversely, when the frame delay is reduced from 2 frames to 1 frame, the frame skip detector 140 may change the first interpolation input frame information from the t−2 time frame to the t−1 time frame.

However, when the frame delay is changed in real-time, frame repetition occurs when the frame delay increases, and a frame skip occurs when the frame delay decreases, which may be another cause for motion judder. In order to prevent motion judder that may occur by changing the frame delay in real-time as described above, when changing the frame delay amount, the frame skip detector 140 may change the frame delay amount when the input image signal is the still section. The still section of the input image may be determined as a section where the still image is continuously input by the frame skip detector 140.

According to an embodiment, when the frame delay of the entire system increases, the number of frames to be stored in the frame buffer 120 also increases. If the size of the frame buffer 120 is not sufficient, even if consecutive frame skips occur, it may be difficult to increase the frame delay. To address such an issue, the display device 100 may further include an image compressor. The image compressor may adaptively determine the image compression rate based on the size of the frame buffer 120 and the amount of frame delay, and store frames compressed at the image compression rate in the frame buffer 120. For example, when the frame delay is increased from one frame to two frames, if the image compression rate is increased from 50% to 75%, the frame delay may be increased without increasing the usage of the frame buffer 120.

Figure 9:
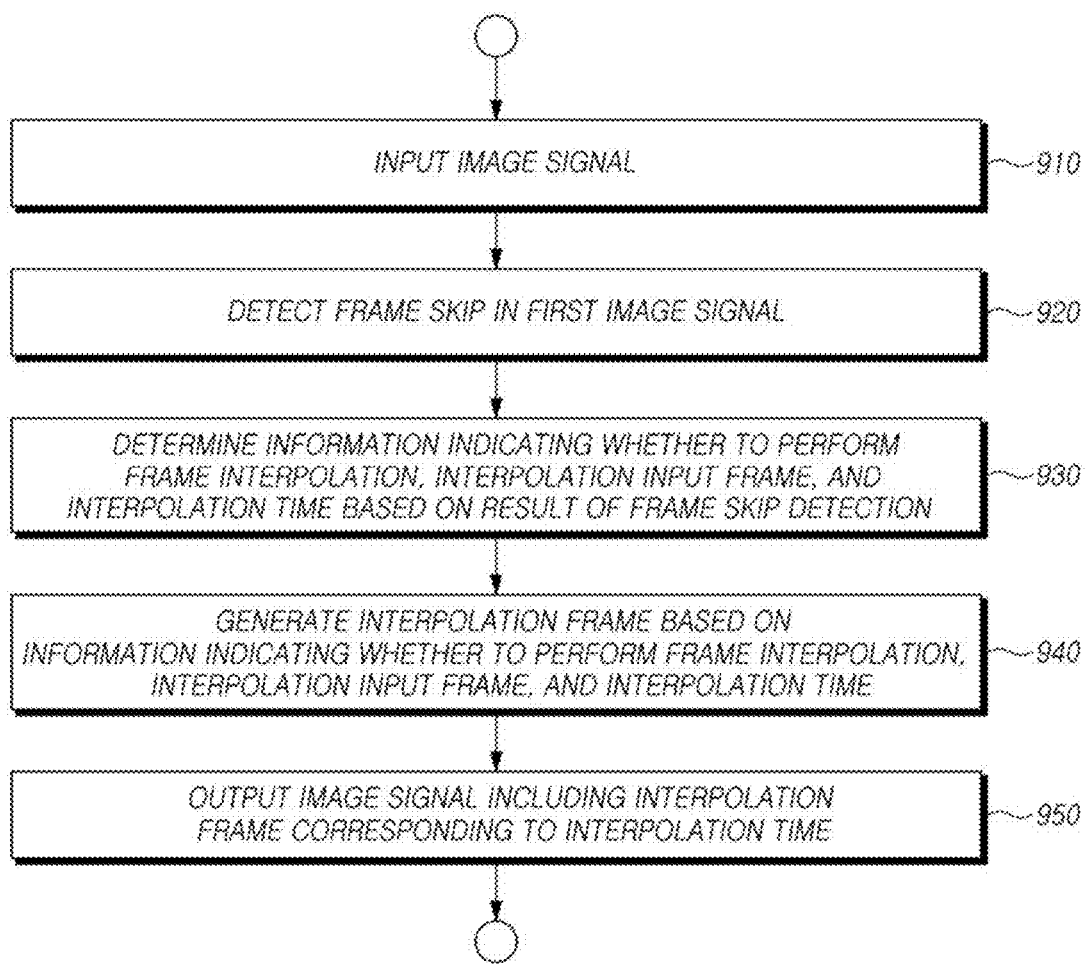
FIG. 9 illustrate a method for removing a motion judder according to an embodiment of the disclosure.

FIG. 9 is a flowchart schematically illustrating a method for removing a motion judder according to an embodiment of the disclosure.

Referring to FIG. 9, in operation 910 according to an embodiment, the display device 100 may receive an image signal. The image signal may be received from the outside of the display device 100 or may be embedded in the display device 100. The display device 100 may receive the image signal from the outside in a wired or wireless manner. The display device 100 may store frames of the image signal in the frame buffer 120. The display device 100 may predict motion information by determining a motion vector that is a displacement between the t−1 time frame and the t time frame obtained from the frame buffer 120.

In operation 920, the display device 100 may detect a frame skip in the image signal. The display device 100 may detect the frame skip by analyzing whether the t time frame currently input and the t−1 time frame input immediately before are the same. Specifically, when the sum (sum of absolute difference (SAD)) of absolute values of all pixels in the difference image between the t−1 time frame and the t time frame is a predetermined reference value or less, the frame skip detector 140 may determine that the t−1 time frame and the t time frame are the same. In this case, the display device 100 may determine a section between the t−1 time frame and the t time frame as a still section. According to an embodiment, even if it is determined that the two consecutive frames are the same as described above, a still image may be actually input, and thus frame skip may not always occur. Accordingly, when one still section is mixed in the moving section, the display device 100 may determine the corresponding still section as the section where the frame skip occurs. To that end, the display device 100 may detect whether there is a frame skip by referring to a result of determining whether the previous frames are the same. Specifically, when the section between the t−2 time frame and the t−1 time frame is determined as the moving section and the section between the t−1 time frame and the t time frame is determined as the still section, the display device 100 may detect the input frame at the t time point as the skipped frame.

In operation 930, the display device 100 may determine information indicating whether to perform frame interpolation, interpolation input frame information (first interpolation input frame information and second interpolation input frame information), and an interpolation time, based on the frame skip detection result of operation 920. The interpolation input frame information may indicate position information of a location where each of the interpolation input frames is stored in the frame buffer 120. When a frame skip occurs, the display device 100 may determine the information indicating whether to perform frame interpolation, which indicates to perform frame interpolation, and determine interpolation input frame information (first interpolation input frame information and second interpolation input frame information) and an interpolation time.

According to an embodiment, the display device 100 may determine whether a frame input after at least one skipped frame is a delayed frame, and may determine interpolation input frame information and an interpolation time based on the determination result. The display device 100 may compare a likelihood between the histogram distribution of the first motion vector between two frames before the skipped frame and the histogram distribution of the second motion vector between at least one repeated frame due to the skip and frame input after the at least one repeated frame, thereby determining whether the frame input after the at least one repeated frame is a delayed frame.

According to an embodiment, when changing a frame rate of the image signal based on an external input, the display device 100 may determine the interpolation input frame and the interpolation time based on the changed frame rate.

According to an embodiment, when the image signal is a frame rate-changed image signal, the display device 100 may detect a frame rate change and generate a key frame with duplicate frames removed. In this case, the display device 100 may determine an interpolation input frame and an interpolation time based on the key frame.

According to an embodiment, the display device 100 may adaptively determine the amount of frame delay based on the frequency of occurrence of the frame skip. When changing the amount of frame delay, the display device 100 may change the amount of frame delay when the input image signal is a still section.

In operation 940, the display device 100 may generate an interpolation frame at the skipped frame position, based on the information indicating whether to perform frame interpolation, the interpolation input frame information, and the interpolation time. The display device 100 may receive interpolation input frames stored in the frame buffer 120 using the interpolation input frame information.

In operation 950, the display device 100 may output an image signal including the interpolation frame corresponding to the interpolation time.

All or some of the components of the display device 100 and the program executed by the display device 100 described herein may be implemented as a hardware component, a software component, and/or a combination thereof. The program may be executed by any system capable of executing computer readable instructions.

The software may include computer programs, codes, instructions, or combinations of one or more thereof and may configure the processing device as it is operated as desired or may instruct the processing device independently or collectively. The software may be implemented as a computer program including instructions stored in computer-readable storage media. The computer-readable recording media may include, e.g., magnetic storage media (e.g., read-only memory (ROM), random-access memory (RAM), floppy disk, hard disk, etc.) and an optically readable media (e.g., CD-ROM or digital versatile disc (DVD). Further, the computer-readable recording media may be distributed to computer systems connected via a network, and computer-readable codes may be stored and executed in a distributed manner. The media may be read by a computer, stored in a memory, and executed by a processor.

The computer-readable storage medium may be provided in the form of a non-transitory storage medium. Here, the term "non-transitory" simply means that the storage medium does not include a signal and is tangible, but this term does not differentiate between where data is semi permanently stored in the storage medium and where data is temporarily stored in the storage medium.

According to embodiments of the disclosure, the program may be included and provided in a computer program product. The computer program products may be traded as commodities between sellers and buyers. The computer program products may include software programs or computer-readable storage media storing the software programs. For example, the computer program products may include software program-type products (e.g., downloadable applications (apps)) that are electronically distributed through manufacturers of electronic devices or electronic markets (e.g., Google Play Store or App Store). For electronic distribution, at least part of the software programs may be stored in storage media or temporarily generated. In this case, the storage media may be storage media of relay servers that temporarily store the software programs, servers of electronic markets, or servers of manufacturers.

The computer program product may include a storage medium of a server or a storage medium of a device in a system including the server and the device. Alternatively, when there is a third device (e.g., a smart phone) that is communicatively connected to the server or device, the computer program product may include a storage medium of the third device. Alternatively, the computer program product may include the software program itself transmitted from the server to the device or the third device, or transmitted from the third device to the device. In this case, one of the server, the device, and the third device may execute the computer program product to perform the method according to the disclosed embodiments. Alternatively, two or more of the server, the device, and the third device may execute the computer program product to distributively implement the method according to the disclosed embodiments. For example, the server may execute the computer program product stored in the server to control the device communicatively connected with the server to perform the method according to the disclosed embodiments. As another example, the third device may execute the computer program product to control the device communicatively connected to the third device to perform the method according to the disclosed embodiment. When the third device executes the computer program product, the third device may download the computer program product from the server and execute the downloaded computer program product. Alternatively, the third device may execute the computer program product provided in a pre-loaded state to perform the method according to the disclosed embodiments.

Although the disclosure is shown and described in connection with embodiments, one of ordinary skill in the art would understand that various changes or modifications may be made without departing from the scope of the disclosure. For example, although the techniques described herein are performed in a different order from those described herein and/or the components of the above-described computer system or modules are coupled, combined, or assembled in a different form from those described herein, or some components are replaced with other components or equivalents thereof, a proper result may be achieved.

What is claimed is:

1. A display device comprising:
   an image input unit configured to receive an image signal;
   a frame skip detector configured to detect a frame skip in the image signal;
   a frame skip compensation adjuster configured to determine information indicating whether to perform frame interpolation, interpolation input frame information, and an interpolation time, based on the frame skip detected by the frame skip detector;
   a frame interpolator configured to generate an interpolation frame, based on the information indicating whether to perform frame interpolation, the interpolation input frame information, and the interpolation time; and
   an image output unit configured to output an image signal including the interpolation frame corresponding to the interpolation time,
   wherein the interpolation input frame information indicates position information of a location where each of interpolation input frames is stored in a frame buffer,
   wherein the interpolation input frame information comprises first interpolation input frame information and second interpolation input frame information, and
   wherein the first interpolation input frame information and the second interpolation input frame information respectively correspond to two different time frames.

2. The display device of claim 1, further comprising:
   the frame buffer configured to store frames of the image signal; and
   a motion predictor configured to predict motion information by determining a motion vector which corresponds to a displacement between a first frame at t−1 time and a second frame at t time obtained from the frame buffer.

3. The display device of claim 2, wherein the frame skip detector is further configured to:
   determine a section between the first frame at t−1 time and the second frame at t time as a still section or a moving section, based on the first frame at t−1 time and the second frame at t time; and
   detect an input frame at t time as a skipped frame in a case that a section between a third frame at a t−2 time and the first frame at t−1 time is determined as the moving section, and the first frame at t−1 time and the second frame at t time is determined as the still section.

4. The display device of claim 3, wherein the frame skip detector is further configured to determine the section between the first frame at t−1 time and the second frame at t time as the still section in a case that a sum of absolute values of all pixels in a difference image between the first frame at t−1 time and the second frame at t time is a predetermined reference value or less.

5. The display device of claim 2, wherein the frame skip compensation adjuster is further configured to adaptively determine a frame delay amount of the display device, based on a frequency of occurrence of the frame skip of the image signal.

6. The display device of claim 5, wherein the frame skip compensation adjuster is further configured to change the frame delay amount in a case that the image signal is a still section when changing the frame delay amount.

7. The display device of claim 5, further comprising an image compressor configured to:
adaptively determine an image compression rate based on a size of the frame buffer and the frame delay amount, and
store frames compressed in the image compression rate in the frame buffer.

8. The display device of claim 2, wherein the frame skip compensation adjuster is further configured to:
compare a likelihood a histogram distribution of a first motion vector between two frames before a skipped frame and a histogram distribution of a second motion vector between at least one frame repeated by a skip and a frame input after at least one repeated frame,
determine whether the frame input after the at least one repeated frame is a delayed frame, based on a result of the comparison of the likelihood the histogram distribution, and
determine the interpolation input frame information and the interpolation time, based on determining whether the frame is the delayed frame.

9. The display device of claim 2, wherein, in a case that a frame rate of the image signal is changed based on an external input, the frame skip compensation adjuster is further configured to determine the interpolation input frame information and the interpolation time based on the changed frame rate.

10. The display device of claim 2, further comprising a frame rate change detector configured to detect a frame rate change and generate a key frame with a duplicate frame removed in a case that the input image signal is a frame rate-changed image signal, and
wherein the frame skip compensation adjuster is configured to determine the interpolation input frame information and the interpolation time based on the key frame.

11. A method for controlling a display device, the method comprising:
receiving an image signal;
detecting a frame skip in the image signal;
determining information indicating whether to perform frame interpolation, interpolation input frame information, and an interpolation time, based on the detected frame skip;
generating an interpolation frame, based on the information indicating whether to perform frame interpolation, the interpolation input frame information, and the interpolation time; and
outputting an image signal including the interpolation frame corresponding to the interpolation time,
wherein the interpolation input frame information indicates position information of a location where each of interpolation input frames is stored in a frame buffer,
wherein the interpolation input frame information comprises first interpolation input frame information and second interpolation input frame information, and
wherein the first interpolation input frame information and the second interpolation input frame information respectively correspond to two different time frames.

12. The method of claim 11, further comprising:
storing frames of the image signal; and
predicting motion information by determining a motion vector which corresponds to a displacement between a first frame at t−1 time and a second frame at t time obtained from the frame buffer.

13. The method of claim 12, wherein the detecting the frame skip in the image signal comprises:
determining a section between the first frame at t−1 time and the second frame at t time as a still section or a moving section, based on the first frame at t−1 time and the second frame at t time; and
detecting an input frame at t time as a skipped frame in a case that a section between a third frame at a t−2 time and the first frame at t−1 time is determined as the moving section, and the first frame at t−1 time and the second frame at t time is determined as the still section.

14. The method of claim 13, wherein the detecting the frame skip in the image signal further comprises determining the section between the first frame at t−1 time and the second frame at t time as the still section in a case that a sum of absolute values of all pixels in a difference image between the first frame at t−1 time and the second frame at t time is a predetermined reference value or less.

15. The method of claim 12, wherein the determining the information indicating whether to perform frame interpolation, the interpolation input frame information, and the interpolation time further comprises adaptively determining a frame delay amount of the display device, based on a frequency of occurrence of the frame skip of the image signal.

* * * * *